United States Patent

[11] 3,544,104

| [72] | Inventor | Herbert R. Jenks<br>Santa Ana, California |
|---|---|---|
| [21] | Appl. No. | 674,958 |
| [22] | Filed | Oct. 12, 1967 |
| [45] | Patented | Dec. 1, 1970 |
| [73] | Assignee | Dura-Fiber, Inc.<br>Costa Mesa, California<br>a corporation of California |

[54] LAMINATED FIBERGLASS DIVING BOARD
5 Claims, 7 Drawing Figs.

[52] U.S. Cl. .................................................... 272/66;
264/229
[51] Int. Cl. ....................................................... A63b 5/10
[50] Field of Search ............................................ 272/66;
52/2, 5, 7, 6

[56] References Cited
UNITED STATES PATENTS
2,807,468  9/1957  Patterson ..................... 272/66

| 2,831,688 | 4/1958 | Knox | 272/66 |
| 3,058,743 | 10/1962 | Gabrielsen | 272/66 |
| 3,178,333 | 4/1965 | Gabrielsen | 272/66 |
| 3,184,233 | 5/1965 | Cook | 272/66 |
| 3,371,928 | 3/1968 | Buddo | 272/66 |

FOREIGN PATENTS
56,190  4/1967  Germany .................... 272/66

Primary Examiner—Richard C. Pinkham
Assistant Examiner—Richard W. Diaz, Jr.
Attorney—Lyon & Lyon ABSTRACT: A laminated fiberglass diving board having an upper and lower skin separated by a plurality of vertical ribs providing hollow cores therebetween wherein the skins and the ribs are molded into an integral structure with the fibers straight and under tension. The board also has an elastomeric covering laminated to the fiberglass and resin and bonded thereto to provide a nonskid surface along the upper surface of the board and over the edges.

Patented Dec. 1, 1970

INVENTOR
HERBERT R. JENKS
BY
Lyon & Lyon
ATTORNEYS

Patented Dec. 1, 1970
3,544,104
Sheet 2 of 2
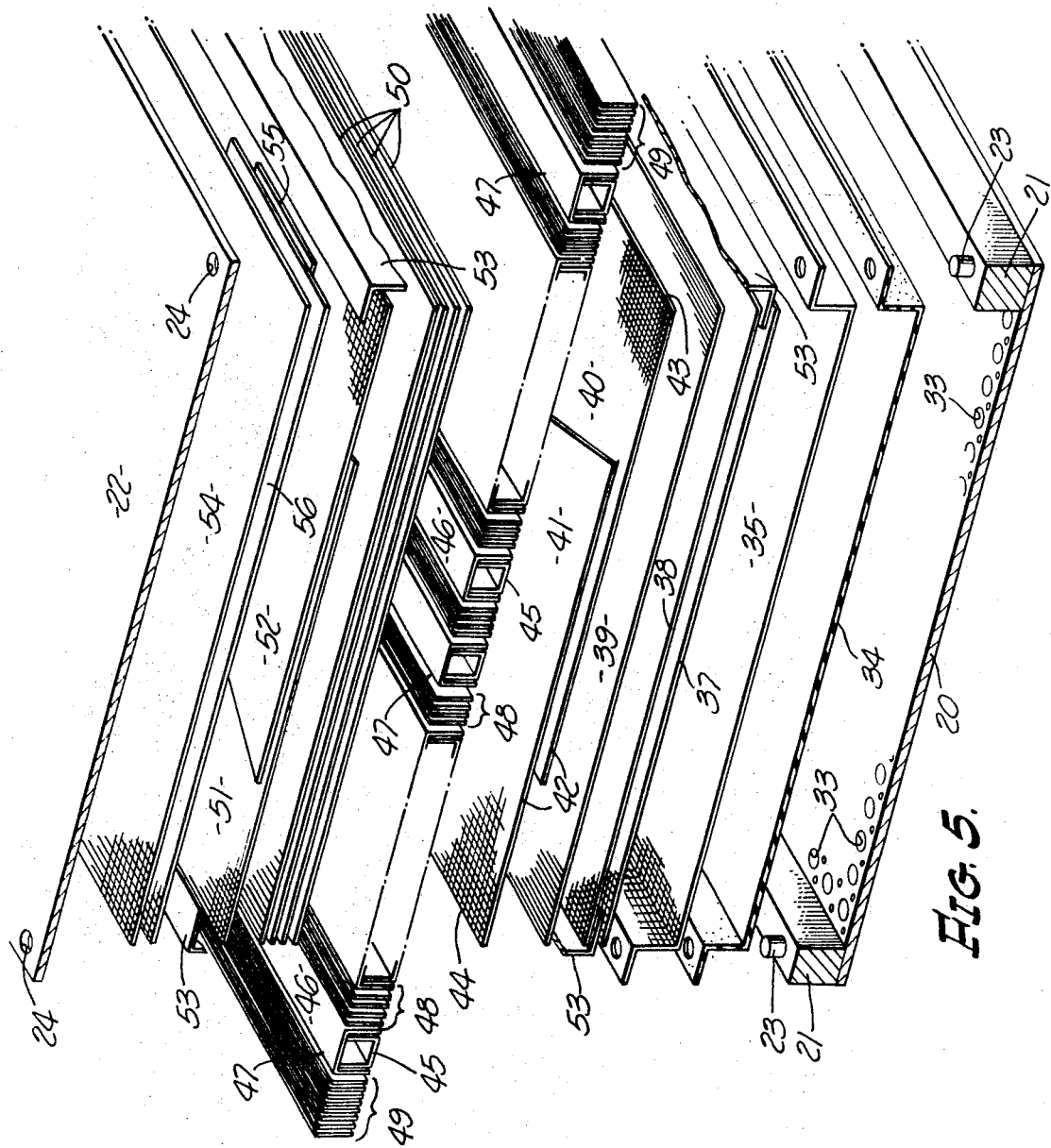
INVENTOR
HERBERT R. JENKS
BY
Lyon & Lyon
ATTORNEYS

LAMINATED FIBERGLASS DIVING BOARD

DESCRIPTION

The present invention relates generally to laminated fiberglass springboards or similar structures. More specifically, the present invention relates to a uniquely constructed fiberglass springboard having enhanced strength and resilience characteristics the construction of which readily adapts it to use for very short diving boards still having the performance characteristics of the large standard length diving boards but without the use of extra springs or the like.

In order to have a desired amount of spring, it has been customary to construct diving boards having a length of about 12 to 16 feet and to make the board out of specially laminated wood, or more recently, out of aluminum. The difficulty with boards of such length is that they require a considerable amount of space, and for swimming pool installations in private homes of even moderate size, the consumption of such space is not desirable. Shorter boards constructed of the usual materials do not have the required spring characteristics and are generally either too stiff or too flexible. Recently, attempts have been made to construct a short diving board having the desired spring characteristics and there is now generally on the market a number of diving boards having a length of approximately 6 feet but the boards themselves do not have the desired spring characteristics and it is necessary to install various types of spring devices such as large coil springs or cantilever springs in order to obtain the desired characteristics. Such diving boards are ordinarily constructed of a laminated wood core covered with a fiberglass material. The necessity for extra spring materials raises the cost of such diving boards and also frequently imparts an unnatural spring characteristic to the board. In addition, such springs sometimes lose their resilience with age and are subject to such aging because of weather conditions.

It is an object of the present invention to provide a solution to the above-mentioned difficulties by the construction of a short diving board having the spring characteristics of the standard 12 to 16 foot diving board yet requiring no auxiliary springs. In addition, a diving board made in accordance with this invention will retain its spring characteristics indefinitely since those characteristics are inherent in the fiberglass material and the method of laminating it and not upon the spring constant of a metal spring. The use of a covering around the edges of the board obviates the necessity for finishing the edges or corners after molding.

Further objects and advantages of the present invention will be more apparent after reading the following detailed description in conjunction with the drawings, in which:

FIG. 5 is an exploded perspective view showing the association and positioning of the various laminations in the molding operation.

FIG. 6 is an enlarged schematic view demonstrating the adhesion of the covering material to the fiberglass material.

FIG. 7 is a sectional view taken along line 7–7 of FIG. 6.

Figure 1:
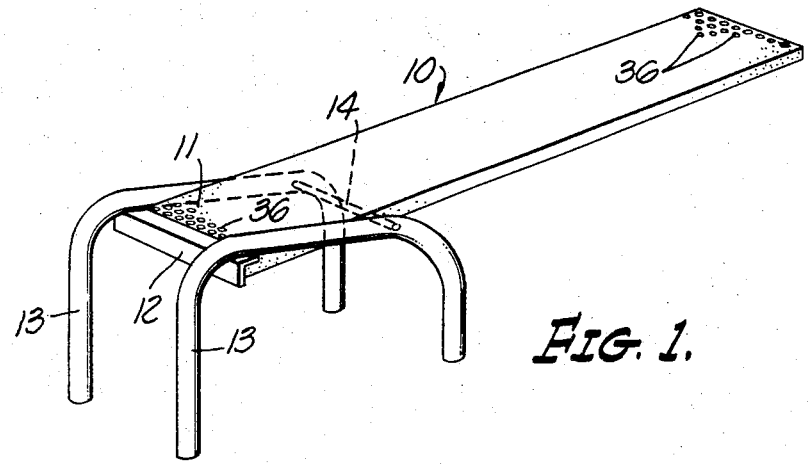
FIG. 1 is a perspective view of a finished and mounted diving board made in accordance with the present invention.

As shown in FIG. 1, the diving board 10 made in accordance with the present invention is mounted in a somewhat conventional manner by having one end 11 secured to a piece of angle material 12 the ends of which are mounted upon the curved pipe supports 13 which elevate the board above ground level. A fulcrum 14 is provided which may be merely a pipe, covered with a rubber bumper, extending across between the pipes 13 so that the board 10 rests thereon. It will be noticed that in the present invention, no additional springs or the like are indicated.

Figure 3:
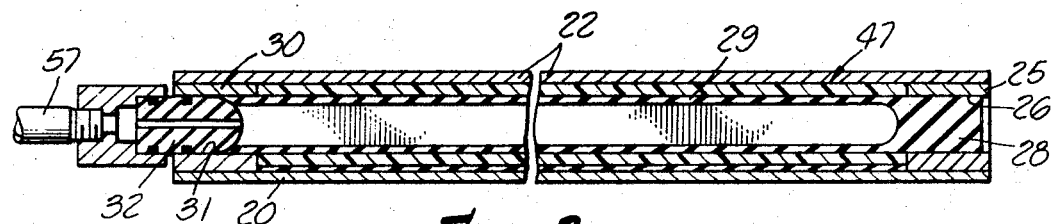
FIG. 3 is a sectional side elevation taken along line 3–3 of FIG. 2 and showing the internal pressure means.

Referring now to FIG. 5, the various laminates employed in the construction of the diving board are shown in exploded view. The mold consists of a bottom plate 20 with longitudinal side rails 21 mounted thereon. As will be explained more fully below, the thickness of the diving board varies slightly from the butt end to the tip and such taper is provided in the side rails 21 as well in order that uniform pressure is applied throughout the surface of the board during the molding process. The top portion 22 of the mold is designed to fit over the side rails 21 and appropriate studs 23 and guide holes 24 are provided. To close the tip end of the mold a metal sleeve 25 is provided which can be seen in FIG. 3. This metal sleeve 25 extends the width of the tip end of the mold and has a plurality of circular apertures 26 therein adapted to receive the solid portion 28 of the internal pressure bags 29. The butt end of the mold is closed by a metallic strip 30 having a plurality of apertures 31 therein adapted to receive the insertion of the pressure bags 29 therethrough together with the retaining nipples 32. The operation of the pressure bags will be more fully explained subsequently.

The inner surface of lower plate 20 has a series of impressions or designs cut therein such as the shallow holes 33 or any other suitable design so that when the board is molded the finished surface thereof will have an embossed, nonskid surface. The first layer or laminate to be inserted in the mold is a covering sheet 34 of uncured elastomeric material which extends along the inner surface of the mold plate 20, up along the longitudinal side rails 21 and extends outwardly over the top edges of those side rails. The elastomeric material when cured provides a nonslip surface for what will ultimately be the top surface of the diving board and by extending the sheet 34 up the side rails and over the corners thereof the sheet 34 will surround the edges of the finished board to cover any sharp edges or corners which might otherwise be formed. The second layer of material 35 is then inserted over the sheet 34 and extends likewise up the side rails and over the edges thereof. This second layer of material 35 is an open-weave, resin-impregnated fiberglass sheet having interstices in the weave thereof sufficient to permit the entry and interlocking of portions of sheet 34 therein during the curing of the elastomeric material and the resin. As shown in FIGS. 6 and 7, during the heat and pressure cycle of the curing process, the molten material of sheet 34 will flow into the interstices of the sheet 35 and form a mechanical and chemical bond therein as demonstrated by the edge view in FIG. 7. The simultaneous curing of the elastomer and the resin causes a chemical bond to be formed, but since the elastomer cures faster than the resin, sheet 35 will trap the flowing resin and hold it in the interstices of layer 35 during the cure of the resin forming a mechanical and chemical bond to sheet 34. Also shown in FIG. 7 are the embossments 36 formed on the top surface of the finished diving board by the impressions 33. The elastomeric material of sheet 34 may be any rubber or rubber and vinyl combination which can be cured in the above-mentioned manner and which exhibits good resistance to weather, sunlight ozone and chlorinated water.

The next material to be inserted in the mold is two layers 37 and 38 of resin-impregnated fiberglass cloth. The layers 37 and 38 are of a bidirectional weave and are cut to a size conforming to that of the inside dimensions of the mold, in other words they do not extend up the sides of the mold. The next laminate is sheet 39, which is resin-impregnated and is a unidirectional weave wherein substantially all of the fibers are oriented longitudinally with the major axis of the diving board.

Figure 4:
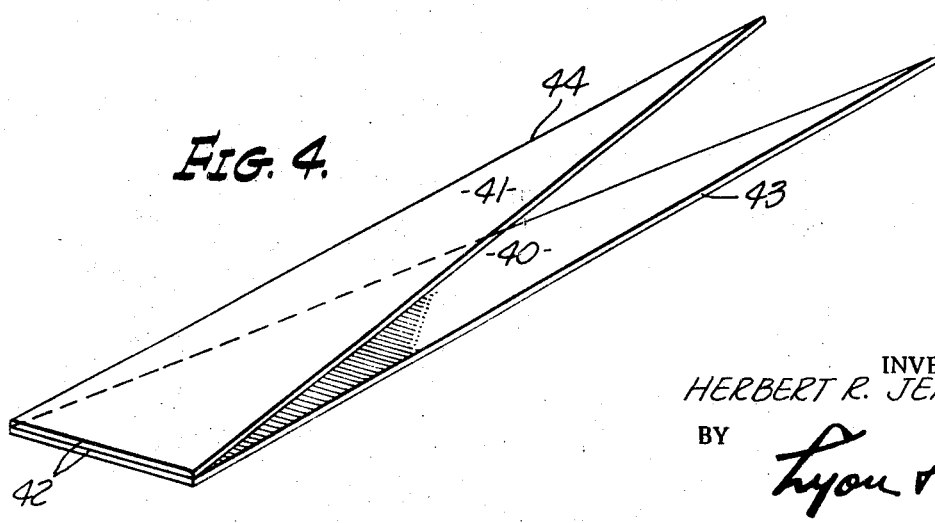
FIG. 4 is a perspective view demonstrating one configuration of the diagonal laminates.

Above the laminate 39 there are situated two diagonal sections 40 and 41 which are also resin-impregnated and have a unidirectional weave. The orientation of diagonal sections 40 and 41 may be as shown in FIG. 4 wherein the large ends of these diagonal sections overlap and are coterminous at the butt ends 42 thereof and the outside edges 43 and 44 are parallel and the inner edges taper diagonally from one corner to the other of the rectangle which forms the outside dimension of the diving board. Alternatively the shape of diagonal sections 40 and 41 may be somewhat different to impart different degrees of flexibility and strength to the board. For example, the board can be made stiffer and stronger by starting the taper of sheets 40 and 41 about 2 feet from the butt end, or just past the fulcrum area. The tip of the board may perhaps need to be more flexible in such case and this can be done by tapering sections 40 and 41 to an end about 2 feet short of the tip. The purpose of providing diagonal sections is to provide a greater amount of material or thickness near the butt end of the diving board up through the area where the fulcrum 14 contacts the board, which is ordinarily approximately a foot and one-half from the butt end of a 6 foot board. The tapering of the material towards the tip end of the board lightens the board so that the tip is not unnecessarily heavy and the decrease in material at the tip end makes the tip more flexible and softer so that the tip end will flex to a greater degree than the rest of the board. As a result of making the tip end softer, it will not have as much lift or spring as if the board were homogenous in width but more lift will be generated at the fulcrum area and as a result the diver will be projected upwardly from the tip of the board as it returns to a horizontal position rather than in a direction normal to the board when in its curved position as would otherwise be the case in a board which would flex to the degree that the board of this invention does. Thus, the shape size and orientation of the diagonal sheets can be varied to impart various performance characteristics to the board.

Next adjacent the diagonal sections 40 and 41 the core material for the hollow core of the board is inserted. This comprises a plurality of U-shaped channel members 45 and 46 assembled to form a hollow rectangular core section 47 as shown in FIG. 5. For a diving board of standard width, approximately ten sets of the channel members 45 and 46 will be sufficient. Interposed between each set of channel members are four strips 48 of resin-impregnated glass cloth having a width substantially the same as the height of the core sections. Of these groups of four strips, two are of a bidirectional weave and two are unidirectional. Along each outside edge of the core sections are additional ones of these strips 49 similar to the strips 48 but greater in number. Where four of the strips 48 are provided between cores, it is proposed that approximately eight of the strips 49 be used along the outside to provide additional protection to the interior cores against injury from lateral impact. Of the eight strips, half are unidirectional and half are bidirectional. The next laminations adjacent the core sections are four layers 50 of unidirectional, resin-impregnated cloth cut to the rectangular shape of the interior dimensions of the mold. Next adjacent the laminations 50 are a second pair of diagonal members 51 and 52 which are placed in position the same as the lower pair of diagonal sections 40 and 41. A U-shaped edge rib 53 is positioned along each edge of the laminations and the lateral projections extend between the layers 37 and 38 up and over the diagonal pieces 51 and 52, thus tying together the top and bottom layers and encompassing the core section therebetween.

Next adjacent the diagonal members 51 and 52 and the lateral projections of the side ribs 53 there is provided a final layer 54 of bidirectional, resin-impregnated glass cloth having an outer rectangular dimension conforming to the interior dimensions of the mold. The section depicted in FIG. 5 is taken near the fulcrum area of the board rather than at the butt end and for this reason the diagonal pieces 40 and 41 are not seen to overlap entirely. In addition, the section was made at this point to demonstrate the additional reinforcing added for the underside of the board at the fulcrum area. Two additional sheets 55 and 56 of bidirectional, resin-impregnated glass cloth are inserted at this point. These sheets 55 and 56 extend only a few inches of the length of the board, just enough to provide a reinforced area at that point where the board contacts the fulcrum.

The provision of unidirectional layers and strips in combination with the sheets having a bidirectional weave accomplishes the formation of a unitary structure having uniform distribution of material. The result is the elimination of undesirable prestressed portions of the structure where such stresses could not be predicted or controlled thereby resulting in unexpected warping or the like. By orienting the unidirectional fibers in line with the major axis of the board, the fibers can move laterally when the resin becomes fluid during cure and such fibers will move to fill in spaces and form fillets in response to the internal pressure in the bags 29 since the fibers will tend to move to areas of low pressure.

Figure 2:
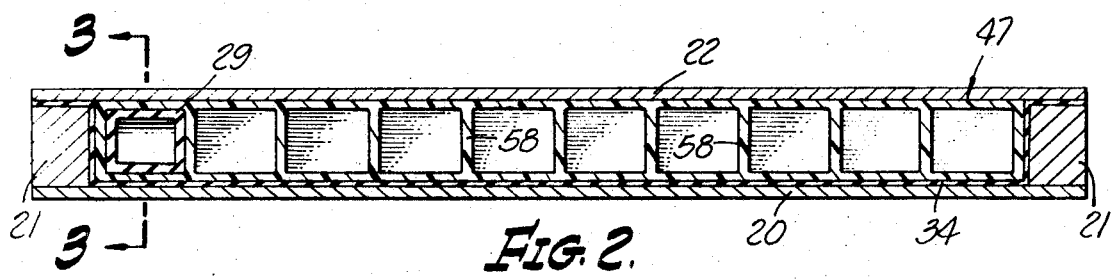
FIG. 2 is a cross-sectional view of the diving board while in the molding stage, the mold being in the inverted position.

The method of manufacturing the diving board herein begins with the formation of a mold having a generally rectangular shape with the thickness preferably tapered from the butt end to the tip. The inner surface of one face of the mold may be engraved to form an embossed design on one surface of the finished board. The lamination begins with the insertion into the mold of the laminates 34, 35, 37 through 41 and the bottom half 45 of each of the ten core sections. Then the longitudinal pressure bags 29 are laid in each of the U-shaped sections 45 whereupon the top sections 46 are then assembled in overlapping fashion as shown in FIG. 5 and the strips 48 and 49 are inserted and the remainder of the laminates 50 through 56 are then assembled in the fashion already described. Next the solid rubber end 28 of the pressure bags 29 is inserted in the metal sleeves 25 at the tip end of the diving board mold and the top cover plate 24 is placed over the side rails 21. The entire mold assembly is then inserted between heated platens of a press (not shown) and the mold is heated until such time as the resin becomes soft and tacky. Air pressure is then supplied through pipes 57 (FIG. 3) whereupon the interiors of the pressure bags 29 are pressurized causing expansion of the hollow core sections 47. The expansion under this interior pressure between upper and lower laminates assures an even and uniform distribution of such layers and in addition assures vertical orientation of the fibers in the hollow core section walls 58 (FIG. 2). It is important that the fibers in the vertical wall sections 58 be oriented vertically and, in fact, that they be placed under some degree of tension during the curing process. Because the adjacent portions of the U-shaped channel members 45 and 46 are movable vertically relative to one another upon the expansion of pressure inside the hollow core 47, as soon as the resin becomes tacky, some adhesion will occur between adjacent vertical portions of the U-shaped channels and subsequent expansion of the core will place the fibers in those vertical sections under tension. Tension provided in these vertical wall sections 58 imparts maximum strength capability thereto and also increases the ability of the finished structure to withstand substantial bending moments.

Prior to pressurization of the bags 29, opposing pressures are applied to the upper and lower surfaces of the mold 20 and 24 and the mold is retained under heat and pressure in this manner for a period of time sufficient for the resin to cure. As an alternative to the use of a press as such, the external pressure, or resistance to internal pressure, could be supplied by securely fastening the upper and lower plates 20, 24 together and assuring that they retain their shape, as by suitably reinforcing them. As an additional alternative to the use of heated platens on the outside of the mold, the necessary heat could be supplied by the use of steam pressure in the bags 29. Thus, all heat and pressure required for the molding and curing process may be internally supplied.

After the resin has cured, the pressure in the bags is first released, the mold is removed from the press, then the mold is opened and the bags are withdrawn from the hollow cores 47 and the finished board is removed from the mold. The resulting structure is a unitary, homogenous fiberglass board having a plurality of longitudinal hollow cores and having one surface and the edges thereof covered by an embossed cover sheet of rubber of the like. The laterally extended edges of the cover sheet and one layer of fiberglass material may then be trimmed off and the surface of the board may be finished by light sanding in order to remove any glossy finish left by the molding process. The board at this point still has openings at each end where the hollow cores were formed and it then remains to close them by whatever means is suitable. The tip end may be closed by grinding about one-half inch off of the hollow cores and cementing in a T-shaped rubber extrusion (not shown). The butt end of the board may be sealed off with a strip of fiberglass material using any suitable cement or the butt may be left open as it is covered by the mounting angle member 12.

While particular embodiments of the present invention have been shown and described it will be obvious to persons skilled in the art that changes or modifications might be made therein without departing from this invention in its broader aspects, and it is the aim of the appended claims to cover all such changes and modification that fall within the true scope and spirit of this invention.

I claim:
1. A laminated fiberglass diving board comprising:
an upper skin, a lower skin and a central section;
said central section comprising a plurality of hollow cores extending longitudinally of said board, each of said core sections being separated by vertical elements the fibers of which are under tension in the vertical direction;
said central section being integrally formed with said upper and lower skins; and
said upper skin including a sheet of open weave fiberglass cloth and a sheet of elastomeric material, said elastomeric material being vulcanized to said sheet of fiberglass cloth, portions of said elastomeric material protruding through the interstices in said cloth, said elastomeric material also extending along the edges of said diving board.

2. A diving board as described in claim 1 wherein said elastic material is embossed upon the outer surface thereof to provide a nonslip surface.

3. A diving board as described in claim 2 wherein the thickness and the stiffness of the board is greater at the butt end than at the tip end thereof; said difference in thickness and stiffness being formed by diagonally cut fiberglass sheets incorporated in said top and bottom skins.

4. A diving board of the type described in claim 1 wherein said sheet of open weave fiberglass cloth is impregnated with resin, portions of said elastomeric material being intermixed with said resin, there being both a mechanical and chemical bond between said elastomeric sheet and the remainder of said diving board.

5. A diving board as described in claim 3 wherein said diagonally cut fiberglass sheets comprise pairs of triangularly cut sheets so positioned as to have their bases positioned in overlapping relationship and situated near the butt end of said diving board, the apexes of said sheets being situated at laterally disposed positions near the tip end of said diving board.